April 16, 1968   E. A. GLASSEY   3,377,869
CLOSED CIRCUIT DENSITY CONTROL INSTRUMENT
Filed July 12, 1965   2 Sheets-Sheet 1
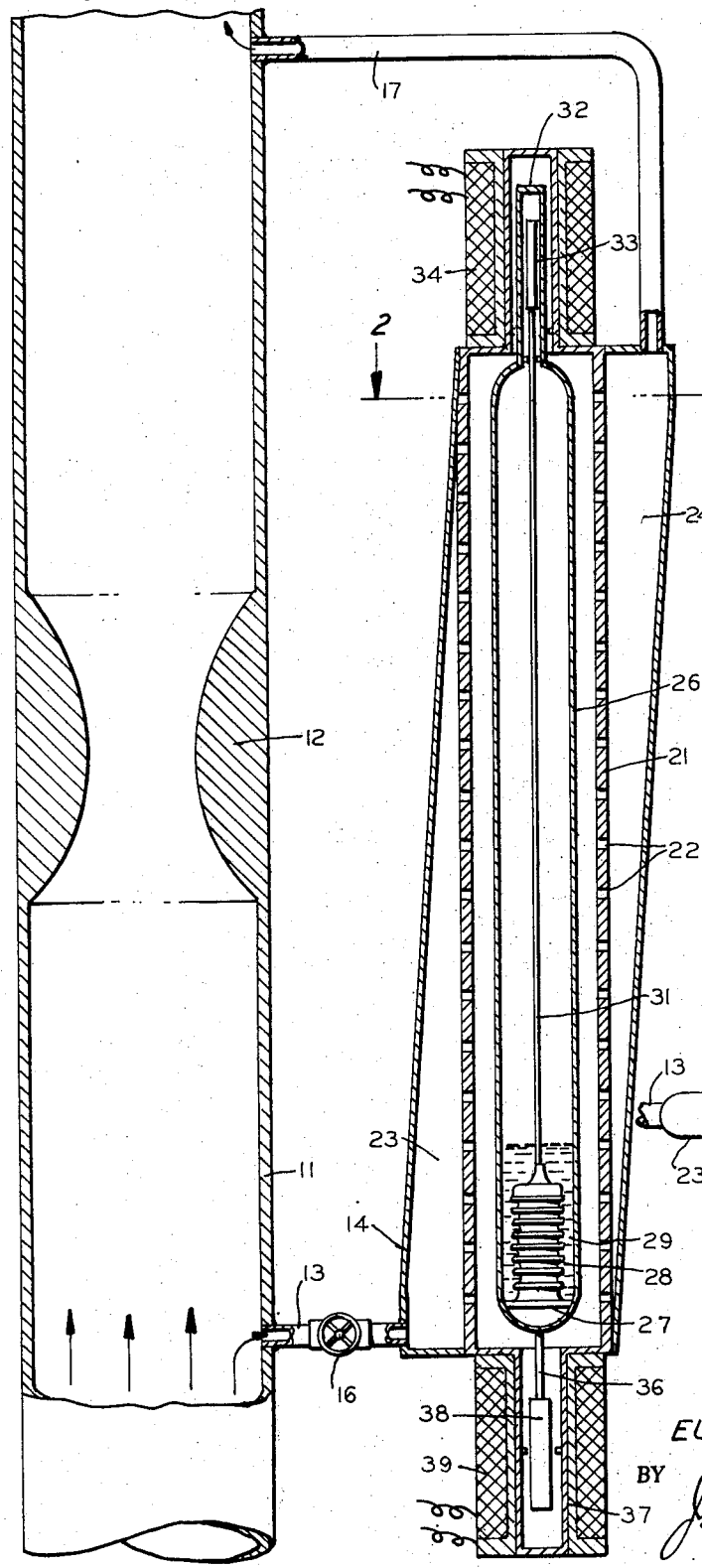
FIG_1
FIG_2
INVENTOR.
EUGENE A. GLASSEY
BY
*Jillian Caplan*
ATTORNEY

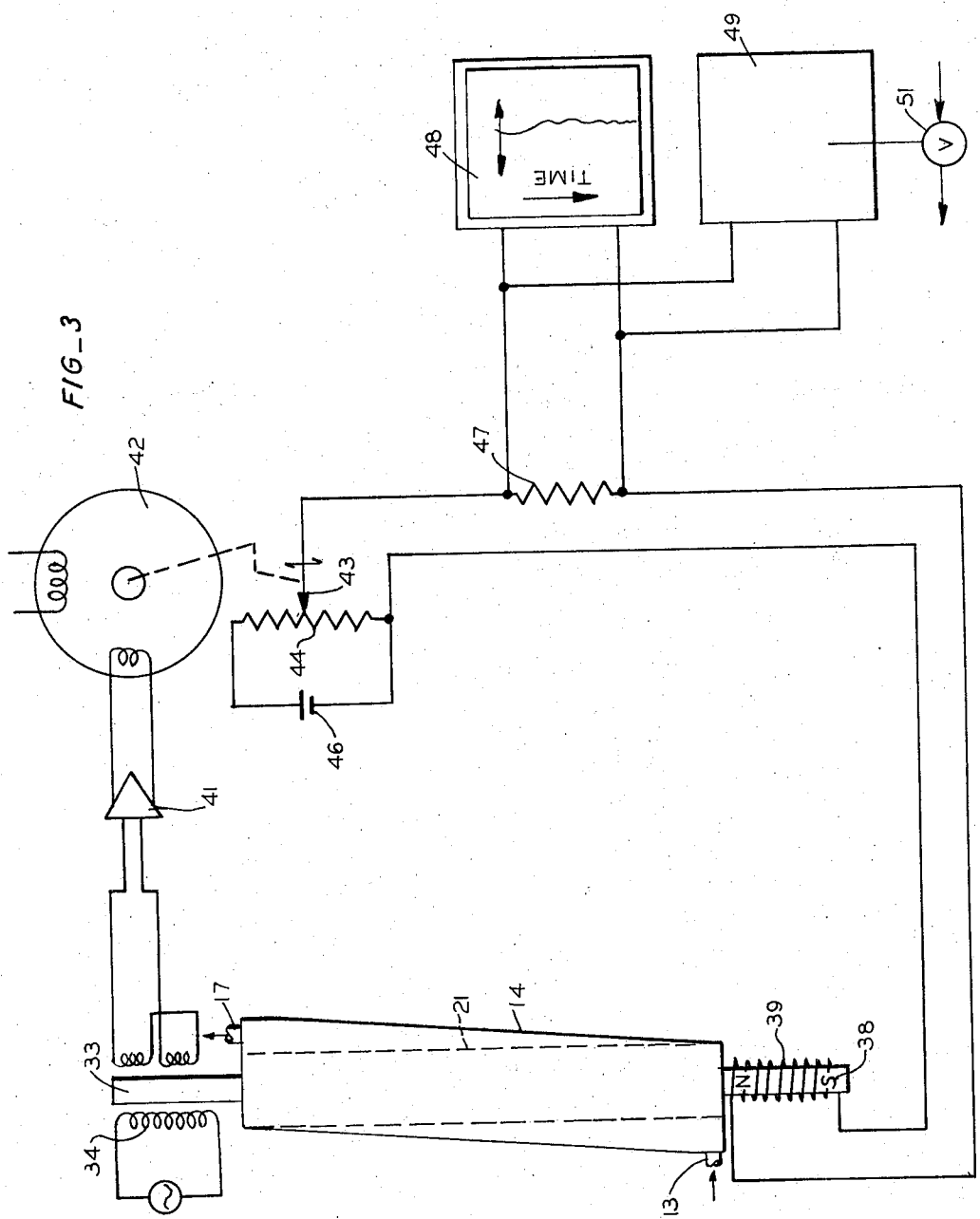

United States Patent Office

3,377,869
Patented Apr. 16, 1968

3,377,869
CLOSED CIRCUIT DENSITY CONTROL
INSTRUMENT
Eugene A. Glassey, Los Altos, Calif. (% Exactel
Instrument Co., 89 Alice Ave., Mountain View,
Calif. 94040)
Filed July 12, 1965, Ser. No. 471,136
2 Claims. (Cl. 73—453)

ABSTRACT OF THE DISCLOSURE

A densitometer continuously samples and discharges liquid flowing through a conduit to record and, if desired, control density. A closed casing receives liquid through an inlet port located at its lower end from one side of an obstruction in a conduit and the liquid is discharged through an outlet port at the top of the casing to the other side of the obstruction. The casing contains a continuously submerged bulb to which the armature of a differential transformer is attached. An external transformer controls current through a coil which attracts another armature attached to the bulb. Measurement of the current through the coil required to maintain the differential transformer armature centered indicates density. Mechanical linkage provides for temperature compensation.

---

This invention relates to a new and improved closed circuit density control and recording instrument. More particularly, the invention relates to an instrument which continuously samples and discharges liquid flowing through a conduit to record the density of the liquid and to make certain adjustments in the components making up the liquid so as to control density. Essentially, the instrument provides a chamber in which is submerged a hydrometer. The armature of a differential transformer moves with the hydrometer and controls a servomotor which adjusts the current through a coil controlling the position of a permanent magnet which is also movable with the hydrometer. By measuring the amount of current necessary to maintain the magnet centered in its coil a record of the density is obtained and further a controller may be energized by said current to control the opening of a valve which regulates flow of one of two components into the line being sampled to maintain a predetermined density.

An advantage of this invention is the simplicity of its construction and its sensitivity to variations in density.

A further advantage of the invention is the fact that although the fluid flowing through the conduit is continuously sampled, nevertheless the sampling is not by a batch method but, on the contrary, instantaneous variations in density through the main conduit affect the control and recording functions of the instrument.

A still further feature of the invention is the fact that variations in rate of flow and pulsations in flow are damped so that the position of the delicate hydrometer bulb is not affected thereby.

Still another feature of the invention is the provision of means within the hydrometer for compensation for variations in temperature of the fluid which affect density readings.

Other objects of the present invention will become apparent upon reading the following specification and referring to the accompanying drawings in which similar characters of reference represent corresponding parts in each of the several views.

In the drawings:

FIG. 1 is a vertical sectional view through the instrument and associated conduit.

FIG. 2 is a transverse sectional view taken substantially along the line 2—2 of FIG. 1.

FIG. 3 is a schematic wiring diagram for the instrument.

Reference numeral 11 indicates a conduit through which a fluid flows in an upward direction as viewed in FIG. 1 past a restriction 12 in conduit 11 so that the pressures on opposite sides of restriction 12 are different. An intake by-pass pipe 13 receives a small but representative portion of the fluid flowing through conduit 11 and conducts same into the interior of casing 14 for the instrument. Valve 16 may be used to shut off flow through by-pass 13. By-pass return 17 returns the sampled fluid from the upper end of casing 14 back into conduit 11 on the opposite side of restriction 12. Interiorly of casing 14 is a cylindrical cage 21 having a plurality of apertures 22 so that the interior of the case 21 is filled with the fluid inside casing 14 but the restriction of access thereto through the apertures 22 prevents variations in flow through conduit 11 and pulsations from affecting the reading of the instrument. Casing 14 has an extension 23 at its lower end toward one side into which by-pass 13 discharges, the amplitude of extension 23 diminishing upwardly. Opposite extension 23 is a second extension 24 which discharges into return passage 17. Extension 24 diminishes downwardly at about the same rate as extension 23 diminishes upwardly.

Suspended within cage 21 is an elongated hydrometer bulb 26. Said bulb at its lower end has a stop 27 which supports a bellows 28 which is sensitive to temperature variations in that its axial length varies dependent thereon. Liquid 29 surrounds bellows 28 so that changes in temperature of fluid on the exterior of bulb 26 are transmitted to the bellows. The upper end of bellows 28 is connected to an elongated stem 31 which projects up into an upward extension 32 on the upper end of bulb 26. An armature 33 is located on the upper end of stem 31 and is normally electrically centered relative to differential transformer 34 which surrounds extension 32. A second stem 36 projects from the bottom of bulb 26 into downward extension 37 of cage 21. Stem 36 carries permanent magnet 38 which is normally electrically centered in solenoid 39 surrounding extension 37.

Turning now to the wiring diagram, FIG. 3, it will be seen that the output of transformer 34 is amplified by amplifier 41 to control servomotor 42 adjusting the position of the movable contact 43 of potentiometer 44. Current from a source 46 is adjusted by potentiometer 44 so that the current through solenoid 39 is varied. Since armature 33 tends to be electrically centered relative to transformer 34, the servomotor 42 moves until the permanent magnet 38 is centered relative to coil 39 and hence the current flowing from source 46 is proportional to density of fluid in casing 14. A shunt 47 is included in the circuit heretofore described and the current tapped around said shunt is used in connection with a recorder 48 or a controller 49 or both. Recorder 48 is of conventional construction and records on a moving drum or belt variations in current fed into the instrument and thus gives a reading proportional to density in the fluid flowing through conduit 11. Controller 49 is not herein shown in detail or described but a number of commercially available controllers may be used to vary the setting of valve 51 which controls one of a plurality of fluids flowing into conduit 11 and thus controls the density of the fluid.

It will thus be seen that the pull-down solenoid 39 and permanent magnet 38 attached to the hydrometer bulb restore any variations in position of the bulb 26 so that the armature 33 is electrically centered and that the variations in current through the coil 39 necessary to accomplish the foregoing result when measured are a measure of density.

What is claimed is:

1. A densitometer comprising an elongated casing for fluid, a hydrometer bulb supported by said fluid and movable longitudinally in said casing, a first armature mounted in said bulb and movable with said bulb, a differential transformer positioned adjacent said first armature externally of said bulb and excited by the position of said first armature, a servomotor energized by said transformer, electrical variable means operated by said servomotor, a second armature movable with said bulb, an electromagnetic coil influencing the position of said second armature, an electric circuit comprising a source of current, said coil and said electrical means for varying flow of current through said coil to adjust the position of said second armature relative to said coil to electrically center said first armature in said transformer, means for measuring flow of current in said circuit, a pipe for fluid, means creating an obstacle to flow in said pipe, a fluid inlet at the bottom of said casing, a fluid outlet at the top of said casing, said inlet communicating with said pipe on the upstream side of said obstacle, said outlet communicating with said pipe of the downstream side of said obstacle, whereby said casing continuously samples fluid in said pipe and fluid is continuously changed within said casing, and a longitudinal link in said bulb and a temperature responsive member on said link fixed at one end to said bulb, said first armature mounted on said link and movable within said bulb responsive to temperature variation of said member.

2. A densitometer comprising an elongated casing for fluid, a hydrometer bulb supported by said fluid and movable longitudinally in said casing, a first armature mounted in said bulb and movable with said bulb, a differential transformer positioned adjacent said first armature externally of said bulb and excited by the position of said first armature, a servomotor energized by said transformer, electrical variable means operated by said servomotor, a second armature movable with said bulb, an electromagnetic coil influencing the position of said second armature, an electric circuit comprising a source of current, said coil and said electrical means for varying flow of current through said coil to adjust the position of said second armature relative to said coil to electrically center said first armature in said transformer, means for measuring flow of current in said circuit, a pipe for fluid, means creating an obstacle to flow in said pipe, a fluid inlet at the bottom of said casing, a fluid outlet at the top of said casing, said inlet communicating with said pipe on the upstream side of said obstacle, said outlet communicating with said pipe of the downstream side of said obstacle, whereby said casing continuously samples fluid in said pipe and fluid is continuously changed within said casing, and a perforated cage within said casing surrounding said bulb, said cage shielding said bulb from abrupt variations in flow through said inlet.

References Cited

UNITED STATES PATENTS

| | | | |
|---|---|---|---|
| 797,027 | 8/1905 | Tilden | 73—202 |
| 2,185,205 | 1/1940 | Linebarger | 73—449 |
| 2,837,922 | 6/1958 | Henry | 73—453 |
| 3,040,585 | 6/1962 | Chatel et al. | 73—453 |
| 2,273,850 | 2/1942 | Ewald | 265—44 |
| 3,182,495 | 5/1965 | Johnson | 73—141 |

FOREIGN PATENTS

| | | |
|---|---|---|
| 933,337 | 8/1963 | Great Britain. |
| 215,711 | 12/1950 | Austria. |

RICHARD C. QUEISSER, *Primary Examiner.*

JAMES GILL, *Examiner.*

J. D. SCHNEIDER, *Assistant Examiner.*